United States Patent

[11] 3,581,123

[72] Inventor Jurgen Pest
Lynchburg, Va.
[21] Appl. No. 811,031
[22] Filed Mar. 27, 1969
[45] Patented May 25, 1971
[73] Assignee General Electric Company

[54] CIRCUIT FOR PROVIDING INDUCTIVE IMPEDANCE

1 Claim, 1 Drawing Fig.

[52] U.S. Cl. .......... 307/304, 333/80T
[51] Int. Cl. .......... H01p 1/24
[50] Field of Search .......... 330/38, 35, 38 (F); 307/304; 331/117, 180, 181; 333/80, 805

[56] References Cited

UNITED STATES PATENTS

| | | | |
|---|---|---|---|
| 2,521,694 | 9/1950 | Crosby | 333/80X |
| 2,843,741 | 7/1958 | Glenn et al. | 333/80X |
| 3,401,349 | 9/1968 | Mitchell | 330/35X |
| 3,443,240 | 5/1969 | Santilli | 330/35X |
| 3,510,806 | 5/1970 | Gremillet | 333/80 |

*Primary Examiner*—Roy Lake
*Assistant Examiner*—James B. Mullins
*Attorneys*—James J. Williams, Frank L. Neuhauser and Oscar B. Waddell

ABSTRACT: A field-effect transistor, having a source electrode, a drain electrode, a first insulated gate electrode, and a second insulated gate electrode, is provided with a feedback circuit comprising one or more series resistors and one or more shunt capacitors connected between the drain electrode and the first insulated gate electrode. This circuit provides an inductive impedance between the source and drain electrodes without inductive coils.

PATENTED MAY 25 1971 3,581,123
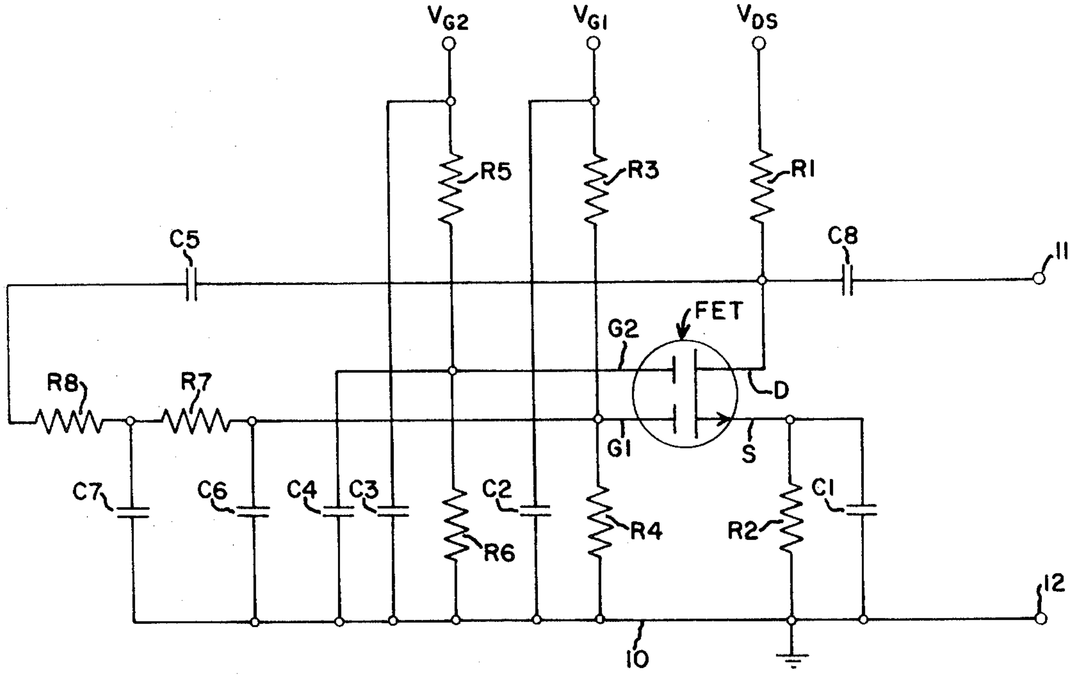
INVENTOR:
JURGEN PEST,
BY James J. Williams
HIS ATTORNEY.

CIRCUIT FOR PROVIDING INDUCTIVE IMPEDANCE

BACKGROUND OF THE INVENTION

My invention relates to a circuit for providing inductive impedance, and particularly to such a circuit that provides an inductive impedance without the use of relatively large inductive coils.

In electrical or electronic circuits, an inductor or an inductive impedance is frequently required to perform some circuit function. The present trend is to make such circuits as small as physically possible, since a small circuit utilizes less space, requires less material, and provides improved operation in some instances. Most of the circuit elements, such as capacitors, resistors, and transistors, have been and still are being made smaller. However, it has been relatively difficult to provide the required magnitude of inductance from a relatively small physical coil. Thus, such circuits have been limited in how small they can be made by the requirements for circuit inductances. Consequently, a circuit designer must either accept a relatively large inductor, or design a circuit that requires a relatively small or no inductance.

Accordingly, an object of my invention is to provide a new and improved circuit that can be relatively small and that can provide a relatively large inductive impedance.

Another object of my invention is to provide an improved electronic circuit having an inductive impedance.

SUMMARY OF THE INVENTION

Briefly, these and other objects are achieved in accordance with my invention by the use of a field-effect transistor having a source electrode, a drain electrode, a first insulated gate electrode, and a second insulated gate electrode, Means are connected to the source and drain electrodes for supplying them with a high impedance source of direct current potential. Means are also connected to the first and second gate electrodes for supplying them with direct current potential. A resistor-capacitor feedback circuit is connected between the drain electrode and the first gate electrode of the transistor. The feedback circuit preferably comprises two series resistors and two shunt capacitors. A bypass capacitor is connected between the second gate electrode and one side of the means for supplying direct current potential. And finally, means are connected to the source and drain electrodes for connecting the inductive impedance presented thereby to an external circuit. The elements forming my circuit may be relatively small and lend themselves to relatively small construction, so that an appreciable magnitude of inductance may be provided by a relatively small arrangement.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

The single FIGURE shows a preferred embodiment of a circuit in accordance with my invention.

DESCRIPTION OF THE PREFERRED EMBODIMENT

With reference to the FIGURE, I utilize a field-effect transistor FET in my improved circuit. The transistor FET is known in the art, and comprises a source electrode S, a drain electrode D, and two insulated gates or gate electrodes G1, G2. In effect, the transistor FET provides two insulated gate, field-effect transistors connected in series so as to provide a cascode amplifier. But for practical reasons, the two transistors in cascode form are provided as a single unit with the two insulated gates G1, G2. A source of direct current potential $V_{DS}$ is connected through a relatively high-impedance resistor R1 to the drain electrode D. The other side of the source of potential $V_{DS}$ is connected to a reference bus 10, which may be connected to a point of reference potential or ground as shown. The source electrode S is connected to the reference bus 10 through a resistor R2 and a capacitor C1. Operating potential for the gate electrode G1 is supplied from a source of direct current potential $V_{G1}$ connected across a voltage-divider comprising two resistors R3, R4. A high frequency bypass capacitor C2 is connected across the source $V_{G1}$. The other gate electrode G2 is similarly provided with a source of direct current operating potential $V_{G2}$ connected across a voltage-divider comprising two resistors R5, R6. The source of operating potential $V_{G2}$ is also provided with a high frequency bypass capacitor C3. In addition, the gate electrode G2 is also connected to the reference bus 10 by a bypass capacitor C4. The part of the circuit described thus far is known in the art and serves as a cascode amplifier.

In order to present an inductive impedance between the drain and source electrodes D, S, I provide a resistor-capacitor feedback circuit between the drain electrode D and the gate electrode G1. This feedback circuit comprises a direct-current isolating capacitor C5 connected to the drain electrode D, and a first feedback resistor R7 connected between the capacitor C5 and the gate electrode G1. A capacitor C6 is coupled in shunt between the gate electrode G1 and the bus 10. While the feedback circuit comprising the capacitor C5, the resistor R7, and the shunt capacitor C6 provides some inductance, I prefer a second feedback resistor R8 connected between the resistor R7 and the capacitor C5, and a second shunt capacitor C7 connected between the junction of the resistors R7, R8, and the bus 10. With this feedback and amplifier circuit in operation, an inductive reactance is presented by the circuit at output terminals 11, 12. The terminal 11 is preferably isolated from direct current by a capacitor C8 connected between the terminal II and the drain electrode D, and the terminal 12 may be connected directly to the reference bus 10. An inductive impedance is presented at the terminals 11, 12 because the voltage at the terminals 11, 12 leads the current that flows through an output impedance between the terminals 11, 12 by some angle. This angular relationship, and hence an inductive impedance, is provided by my novel arrangement of the field-effect transistor FET and the resistor-capacitor feedback circuit. Persons skilled in the art will appreciate that the circuit shown in the drawing can be constructed in relatively small dimensions, such as in microelectronic circuit form, since the field-effect transistor FET, the resistors, and the capacitors can be very small in physical size.

The embodiment shown in the drawing has actually been constructed and tested with circuit elements having the following sizes or characteristics:

| Component: | Values |
|---|---|
| Transistor FET | TRW, Type PT 220 |
| Voltage $V_{DS}$ ------volts | +28 |
| Voltage $V_{G1}$ ------do | +6 |
| Voltage $V_{G2}$ ------do | +12 |
| Resistor R1------ohms | 20, 000 |
| Resistor R2------do | 2, 000 |
| Resistor R3------megohm | 1 |
| Resistor R4------do | 1 |
| Resistor R5------do | 1 |
| Resistor R6------do | 1 |
| Resistor R7------ohms | 100, 000 |
| Resistor R8------do | 100, 000 |
| Capacitor C1------μF | 0. 47 |
| Capacitor C2------μF | 0. 1 |
| Capacitor C3------μF | 0. 1 |
| Capacitor C4------μF | 0. 33 |
| Capacitor C5------μF | 0. 33 |
| Capacitor C6------μμF | 100 |
| Capacitor C7------μμF | 100 |
| Capacitor C8------μF | 0. 33 |

With circuit components having the above values and characteristics, an inductive impedance with a Q of approximately 90 was provided at a frequency of 35 kHz. The circuit was also tested by using smaller values for the resistors R7, R8, and the capacitors C6, C7. This circuit had a Q of approximately 55 at a frequency of 635 kHz.

It will thus be seen that my invention provides a new and improved circuit for providing an inductance or inductive impedance. My circuit may be constructed in a relatively small physical size, but provides a relatively large magnitude of inductance. While I have shown only one embodiment of my invention and described its operation only in connection with that embodiment, persons skilled in the art will appreciate that modifications may be made. As already mentioned, the feedback circuit may have only one stage comprising a series resistor and a shunt capacitor, although I prefer the two stages shown. Two single-gate field-effect transistors connected in cascode fashion may be used in place of the single field-effect transistor with two gates as shown. Also, various sizes may be provided for the resistors and capacitors, depending upon the particular application and frequency for which the circuit is intended. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved circuit for providing an inductive impedance comprising:

a. a field-effect transistor having a source electrode, a drain electrode, a first insulated gate electrode, and a second insulated gate electrode connected in cascode fashion;

b. means connected to said source and drain electrodes for supplying a high impedance source of direct current potential thereacross;

c. a resistor-capacitor feedback circuit connected between said drain electrode and said first gate electrode of said field-effect transistor;

1. said resistor-capacitor feedback circuit comprising a first resistor connected in series between said drain electrode and said first gate electrode, and a first capacitor connected between said first gate electrode and one side of said means for supplying direct current potential;

2. and said resistor-capacitor feedback circuit further comprising a second resistor connected in series between said first resistor and said drain electrode, and a second capacitor connected between the junction of said first and second resistors and one side of said means for supplying direct current potential;

d. a bypass capacitor connected between said second gate electrode and one side of said means for supplying direct current potential;

e. means connected to said first and second gate electrodes for supplying a source of direct current potential thereto;

f. and means connected to said source and drain electrodes for connecting the inductive impedance presented thereby to an external circuit.